June 6, 1939.     R. R. COWEN     2,161,666
WEATHER STRIPPING
Filed Aug. 13, 1937
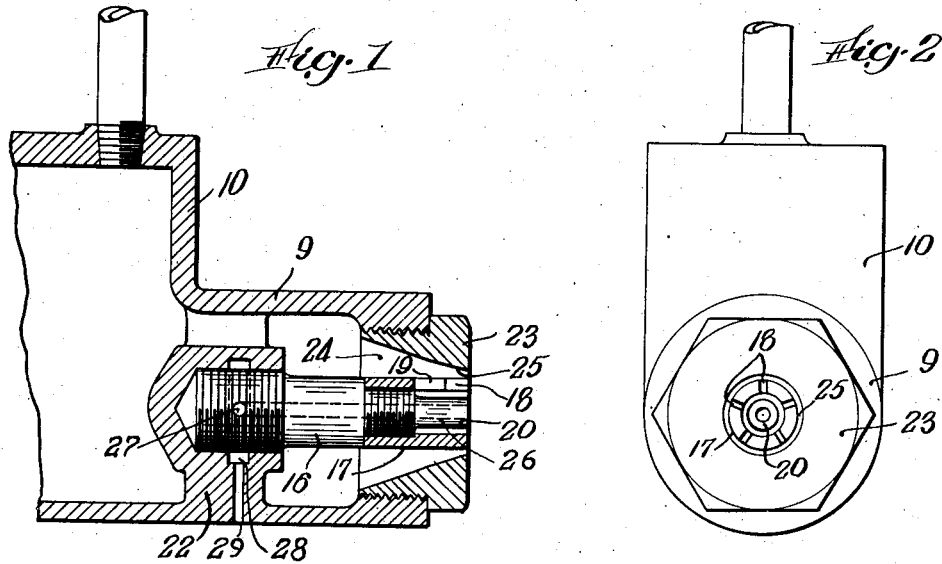
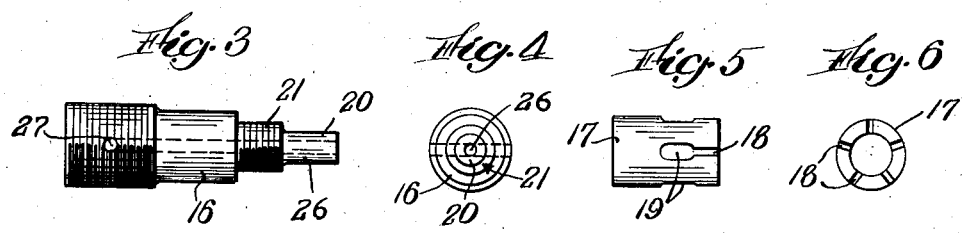
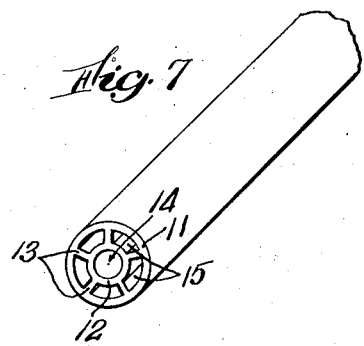
Inventor
RAWSON R. COWEN
By Thomson & Thomson
his Attys.

Patented June 6, 1939

2,161,666

UNITED STATES PATENT OFFICE 2,161,666

WEATHER STRIPPING

Rawson R. Cowen, Taunton, Mass., assignor to New Jersey Rubber Company, Taunton, Mass., a corporation of Massachusetts Application August 13, 1937, Serial No. 158,935

2 Claims. (Cl. 20—69)

This invention relates to improvements in extruded rubber tubing and apparatus for making the same. The principal purpose of the invention is to provide a flexible rubber tubing which is economical to manufacture, durable in use and particularly efficient when employed as a cushion or weather strip around the doors or trunk lids of automobiles.

The rubber stripping heretofore employed for that purpose has been made of sponge rubber or ordinary, hollow tubing, and it has been found that both are unsatisfactory and short-lived. The sponge rubber is expensive to manufacture and soon deteriorates due to the decomposition caused by the moisture trapped within its pores; and the ordinary tubing is either too hard and stiff, or, if soft enough to yield, it is likely to collapse completely or even to split and become useless under the repeated compressive actions to which it is subjected.

The improved tubing herein described and claimed possesses the advantages of both of the former types and the disadvantages of neither. It is easy to make and to handle; it yields sufficiently under pressure, without collapsing or splitting; it returns to its original shape after pressure is released; and it furnishes a weather tight and shock-absorbing protective strip for automotive use. It will be understood, however, that its use is not limited to the automotive field; for the improved tubing may be employed as a cushion or seal whenever a stripping of this type is desired; and that its cross-sectional shape may be subject to wide variation.

A recommended embodiment of the invention is illustrated in the accompanying drawing, in which, Fig. 1 is a vertical section, partly in elevation, of the nose of a conventional extruding machine equipped with apparatus for making the improved tubing.

Fig. 2 is an elevation looking to the left of Fig. 1;

Figs. 3 and 4 are side and end views of a spindle shown in Fig. 1;

Figs. 5 and 6 are side and end views of a collar or cylinder which is fitted onto the spindle, in Fig. 1; and Fig. 7 is a perspective view of a fragment of tubing produced by said apparatus, in accordance with this invention.

As shown in Fig. 7, the improved rubber tubing preferably comprises an outer wall or tube 11, an inner wall or tube 12, and radial walls or webs 13 connecting the two tubes throughout the length of the strip and holding them in spaced, concentric relation; the bore 14 and longitudinal channels 15 constituting the voids of the tubing strip.

This novel construction of a multi-walled tube—or tube within a tube—substantially increases the useful life of the tubing strip, affords greater resilient resistance to compression while at the same time allowing adequate yield under pressure, and avoids any tendency of damage or permanent distortion during normal use.

Tubing of this character is most economically produced by extruding plastic, uncured rubber through suitable dies which form the tubular and radial walls and the intervening voids above described. For this purpose, the nose 9 of the tubing machine 10 has its spindle 16 provided with a collar or tube 17 having radial slots 18 extending inwardly from its outer end and communicating with somewhat larger openings 19. The tube 17 is applied over the reduced tip 20 of the spindle 16 and screwed onto its boss 21, the opposite end of the spindle being threaded into a bracket 22 in the nose 9 so that the spindle extends axially of and projects slightly beyond the nose. A nut 23, having a tapered bore 24 terminating in a central delivery opening 25, is screwed into the nose of the tubing machine, around the spindle, the extreme ends of the nut 23, tube 17 and spindle tip 20 being substantially flush.

In accordance with common practice, the plastic rubber or rubber composition is fed to the nose of the tubing machine by a worm feed. The material is thus squeezed into the cone-shaped bore 24 of the nut 23, inwardly through the openings 19 of the tube 17, and outwardly through the spaces between the tube and nut and spindle tip, respectively, as well as through the slots 18 of the tube or collar. It will be apparent that the open space between the mouth 25 of the nut and the tube 17, forms the outer rubber tube 11; that the space between the tip 20 and the bore of the collar 17, forms the inner rubber tube 12; and that the slots 18 of the collar produce the radial webs 13 of the rubber tubing. It will be understood that the uncured rubber is projected from this die in the form of a continuous stream which may be severed into strips of suitable length for curing.

It will also be understood that rubber stripping of the type generally known as "tubing" may be produced in a variety of shapes, other than round, by changing the contour of the die elements; for this invention is not intended to be limited to a tubing or strip in which either the outer wall 11 or the inner wall 12 are necessarily tubular, as illustrated. Either or both of these walls may be circular or non-circular in cross-section, and the word "tube" is used broadly herein to designate a long, hollow body, regardless of geometrical contour.

It will be evident that the improved tubing is freely flexible as well as resilient; that it may be bent around corners without collapsing or becoming unduly distorted; and that it will continue to maintain its shape and provide an efficient cushioning seal after long use, even when made of relatively soft rubber, because of the strength and support afforded by the improved construction.

The apparatus herein illustrated and described is especially adapted for producing an extruded tube having the aforesaid characteristics, in a single operation; and a desirable method of manufacturing the tubing is disclosed in United States Patent No. 2,125,001, issued July 26, 1938 to myself and Cyril L. Sylvia. In accordance with that disclosure, the tubing extruded from the die of the tubing machine is delivered into a bath of water, and the die is vented to the atmosphere so that water may freely enter within the hollow tubing.

Hence, as herein illustrated, the spindle 16 has an axle opening 26 leading inwardly from the tip 20 to a radial opening 27 which communicates with a passageway 28 formed in the bracket 22 and opening to the atmosphere at 29. This arrangement permits the air in the bore 14 of the inner tube 12 to escape through the vent when the tubing is fed into a bath of water, and allows water to enter the bore and partially set the uncured rubber.

I claim:

1. Weather stripping for the doors and trunk lids of automobiles, or the like, consisting of compressible, resilient, rubber tubing comprising an inner tube, an outer tube, and spaced radial webs connecting the two tubes and holding them in spaced relation.

2. Weather stripping for the doors and trunk lids of automobiles, or the like, consisting of compressible, resilient, rubber tubing comprising an inner tube, an outer tube concentric therewith, and spaced radial webs connecting the two tubes and holding them in spaced relation, the bore of the inner tube and the channels between said webs being substantially unobstructed and constituting longitudinal voids through the tubing.

RAWSON R. COWEN.